(12) United States Patent
Byrne et al.

(10) Patent No.: US 8,549,622 B2
(45) Date of Patent: Oct. 1, 2013

(54) SYSTEMS AND METHODS FOR ESTABLISHING TRUST BETWEEN ENTITIES IN SUPPORT OF TRANSACTIONS

(75) Inventors: James S. Byrne, Reston, VA (US); Christopher W. Middleton, Alexandria, VA (US); Darrell K. Geusz, Port St. Lucie, FL (US); Robert H. Hux, Falls Church, VA (US); Dawn M. Orr, Ashburn, VA (US); Eoin Cosgrave, Alexandria, VA (US)

(73) Assignee: Ipsiti, Inc., Reston, VA (US)

( * ) Notice: Subject to any disclaimer, the term of this patent is extended or adjusted under 35 U.S.C. 154(b) by 0 days.

(21) Appl. No.: 13/175,330

(22) Filed: Jul. 1, 2011

(65) Prior Publication Data
US 2012/0011587 A1 Jan. 12, 2012

Related U.S. Application Data

(60) Provisional application No. 61/361,758, filed on Jul. 6, 2010.

(51) Int. Cl.
*H04L 29/06* (2006.01)

(52) U.S. Cl.
USPC .......... 726/21; 726/22; 726/23; 726/24; 726/25; 726/26; 713/187; 713/188

(58) Field of Classification Search
USPC .......................................... 726/21
See application file for complete search history.

(56) References Cited

U.S. PATENT DOCUMENTS

| | | |
|---|---|---|
| 6,931,419 B1 | 8/2005 | Lindquist |
| 7,506,357 B1 * | 3/2009 | Moriconi et al. ............ 726/1 |
| 2008/0097999 A1 | 4/2008 | Horan |
| 2009/0070128 A1 | 3/2009 | McCauley |
| 2010/0076987 A1 | 3/2010 | Schreiner |
| 2010/0122315 A1 * | 5/2010 | Stollman ............ 726/1 |

OTHER PUBLICATIONS

International Search Report issued in PCT/US2011/042816 Jul. 1, 2011.
Written Opinion issued in PCT/US2011/042816 on 28, 2012.
http://www.personalInfoCloud.com/ electronically captured as available on Jun. 15, 2010 using the internat archive Wayback Machine, 19 pages.

(Continued)

*Primary Examiner* — Longbit Chai
(74) *Attorney, Agent, or Firm* — DLA Piper LLP (US)

(57) ABSTRACT

Systems and methods for determining the identity of entities who meet trust requirements of a privilege grantor include an identity and trust management system including at least one computing device in communication with at least one entity, at least one privilege grantor, and at least one authoritative source. At least one rule is received from the at least one privilege grantor that must be satisfied for the at least one privilege grantor to trust an entity. A database is established of at least one entity with information about the at least one entity. The at least one authoritative source is queried to determine whether at least a portion of the information about the at least one entity is correct. A response is received from the at least one authoritative source as to whether or not the portion of information is correct. The database stores a result of the query without storing data underlying the result. The information stored in the database is compared with the at least one rule to determine if the at least one entity meets the at least one rule. The at least one privilege grantor is notified whether the at least one entity meets the at least one rule based on the comparison, without providing the at least one privilege grantor with either data stored in the database for the at least one entity or the data underlying the result.

16 Claims, 4 Drawing Sheets

(56) References Cited

OTHER PUBLICATIONS http://www.identiftiFinder.com/ electronically captured as available on Jun. 28, 2010 using the internat archive Wayback Machine, 6 pages.

"Federal Identify, Credential, and Access Management (FICAM) Roadmap and Implementation Guidance", The Federal Chief Information Officers Council and the Federal Enterprise Architecture, Version 1.0, Nov. 10, 2009.

* cited by examiner

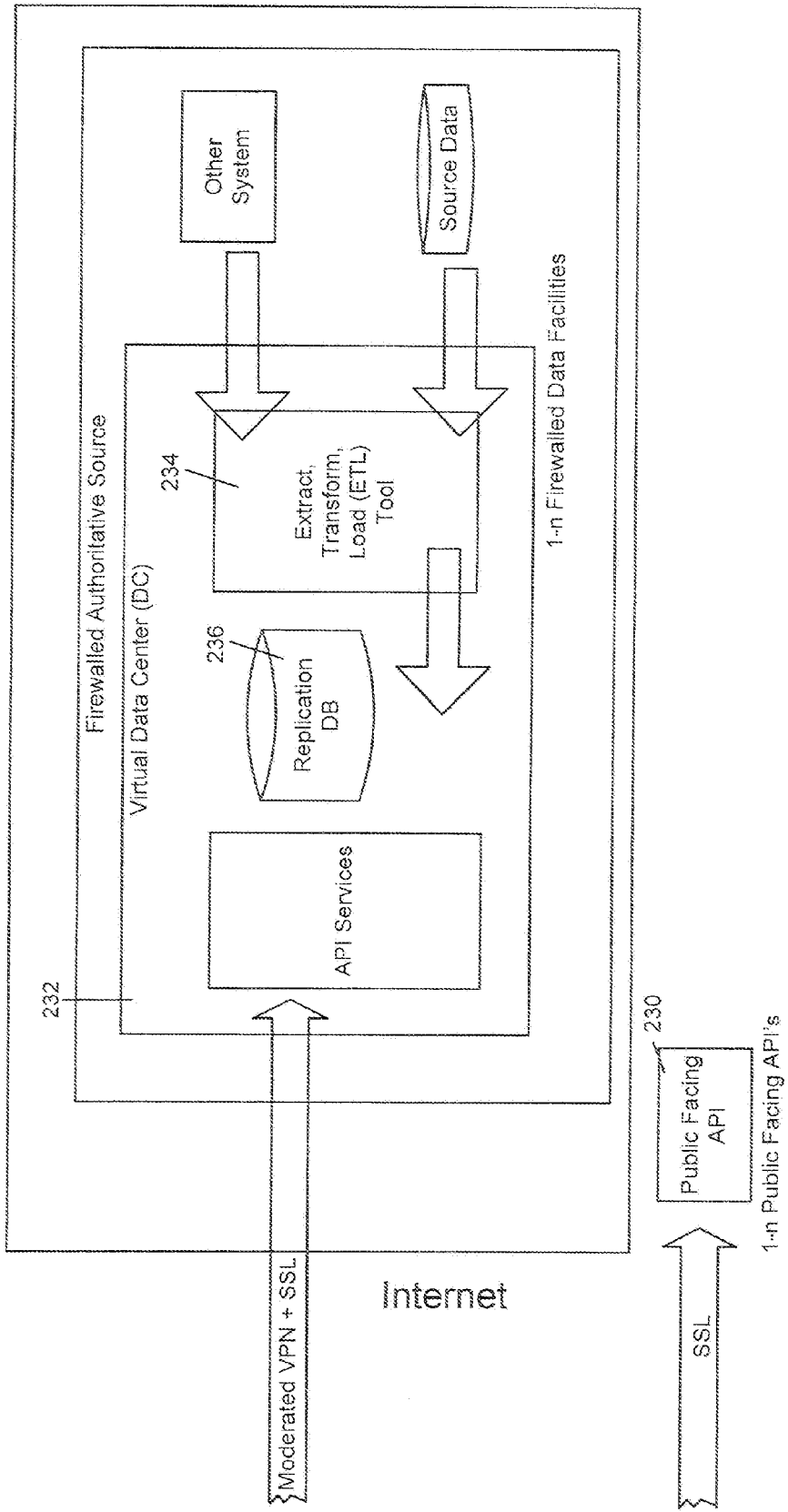

SYSTEMS AND METHODS FOR ESTABLISHING TRUST BETWEEN ENTITIES IN SUPPORT OF TRANSACTIONS

CROSS-REFERENCE TO RELATED APPLICATIONS

This application is based on and derives the benefit of the filing date of U.S. Patent Application No. 61/361,758, filed Jul. 6, 2010. The entire content of this application is herein incorporated by reference in its entirety.

FIELD

The disclosure is directed to systems and methods for establishing trust relationships between various entities and, more particularly, to systems and methods for the establishment of communities by which entities requiring privileges and/or permissions can expose their characteristics to entities that can grant them privileges.

BRIEF DESCRIPTION OF THE FIGURES

FIGS. 2A and 2B are schematic diagrams of an identity and trust management network according to a disclosed embodiment.

DESCRIPTION OF EMBODIMENTS OF THE INVENTION

Figure 1:
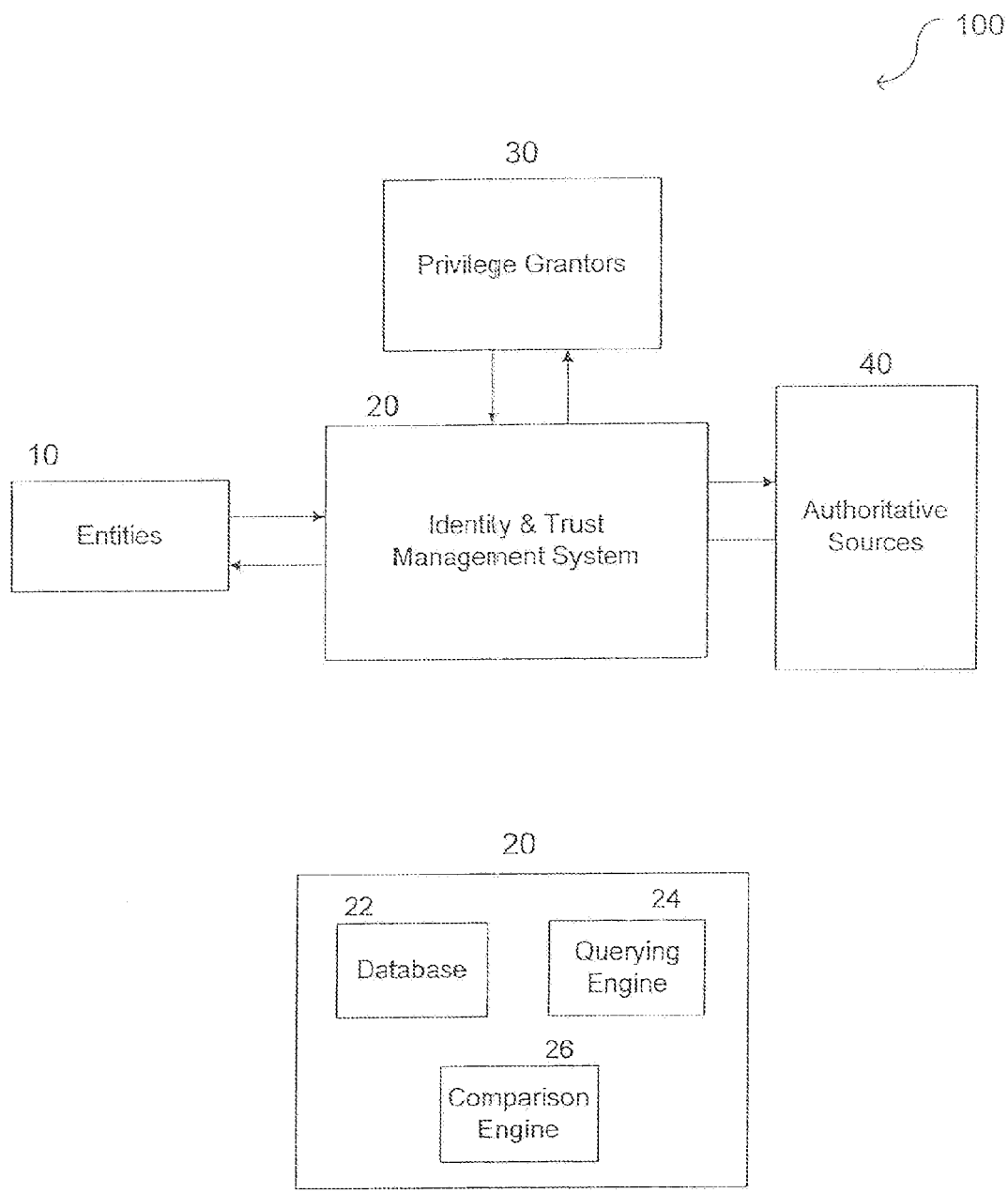
FIG. 1 is a block diagram of an identity and trust management network according to a disclosed embodiment.

FIG. 1 represents an identity and trust management network 100 according to a disclosed embodiment. Network 100 includes one or more entities, users, or members, 10 in communication with identity and trust management system 20. Identity and trust management system 20 may also be in communication with one or more privilege grantors 30 and one or more authoritative sources 40.

At a high level an entity 10 may provide information (e.g. characteristics or attributes) about itself to system 20. An entity may be any individual, an organization, a collection of organizations (e.g. groups, association), a collection of entities (community), a computer application, and/or collection of applications (system) which can be described by a series of characteristics, or attributes, which can be evaluated against a set of criteria (e.g. rules) to determine satisfaction/failure of the criteria. This information may include identification data about the entity (e.g. in terms of an individual, biographic information (name, date of birth, contact information); in terms of applications or organizations, identification, owner, contact information; in terms of collections/groups, name, point-of-contact, contact information); credential identification (e.g. organizational identification cards, drivers license, state/federal ID), professional or capability data (e.g., occupation data, professional certifications data, skills designations), membership data (e.g. employer, association, affiliation) and any other data that entity 10 deems relevant to share with system 20 for purposes of establishing relationships of trust with privilege-grantors 30.

The information provided by entity 10 may only include sufficient data to uniquely identify the entity (e.g. identification data) and/or data to uniquely define the characteristics being provided as being associated with the entity 10 (e.g. Driver License (State, Drivers name, number)) to support identification of the entity and verification/validation of the characteristics.

The information, or characteristics, provided by the entity 10 may be considered 'claims' about the entity. Entity data provided to the identity and trust management system 20 is reference based, in that the data (a) is not the authoritative source data and (b) only includes the claim and associated data required to validate the claim against an authoritative source 40.

The information provided by entity 10 to system 20 may be in the form of various classes. These classes of information may include, for example, biographic information about entity 10 (e.g., name, date of birth, contact information); credential identification information about entity 10 (e.g. driver's license, state/Federal ID, Organization badge data); capability information about entity 10 (e.g., law enforcement, medical service provider, fire fighter, banker, lawyer); medical information about entity 10 (e.g., blood type, DNA sequence); financial background information about entity 10 (e.g., banking information, credit score information); or any other such classes of information that may be established by entity 10, system 20, privilege grantor 30, or any combination thereof. System 20 may use these classes to abstract general characteristics, or attributes, about information, or claims, provided by entity 10 in order to enable the application of claims against rules against either the specific data or the abstractions associated with the class. Class definitions allow information elements from different, but similar sources (e.g. California Fire Fighter certification, Ohio Fire Fighter certification) to be related for interoperability (e.g. certified Fire Fighter). As an example an entity 10 may provide the system with credential information for a Virginia driver's license held by entity 10 (issued by the State of Virginia and including a photo of the applicant). System 20 may define a class of credential that includes abstract attributes such as "issued by a Federal/State authority" and Includes Photo ID", both of which are satisfied by the Entity 10 provided credential. Subsequently a rule requiring the entity 10 to have a "credential issued by a Federal/State ID AND including a photo ID" would be satisfied by this class definition, without specifically defining the credential to be from the State of Virginia.

Alternatively, entity 10 may define different collections of information across the information, characteristics, and classes provided. These different classes or collections of information pertaining to entity 10 may be referred to as different personae of entity 10. In an embodiment, each persona of entity 10 may represent a separate capability of entity 10, a collection of capabilities relevant to a role fulfilled by entity 10, a common set of privileges (e.g. access control, medical services, financial transactions), community (emergency response), or in support of a specific privilege/permission to be provided by privilege grantor 30. For example, information related to the role of entity 10 as an emergency responder may include credential identification information recognized in emergency scenarios plus capabilities, professional skills, and organization membership recognized and potentially required in emergency situations. Furthermore, information related to financial capabilities (e.g. bank account information), although entered by entity 10 in system 20, would not be included in the emergency responder persona as it was neither required for the role(s) (e.g. permissions/privileges), or sought or desired to be shared with the privilege grantors 30. Entity 10 characteristics may be included in none, one, or multiple personae.

In providing information entity 10 may define data privacy rules associated with their data at either/both the element and/or personae level in system 20. In an embodiment, entity 10 may specify the level of data about themselves/itself that may be shared with privilege grantors 30 in support of trust relationships. The level of data may range from status only (e.g. the fact whether entity 10 has/has not the characteristic in question), information validation data (e.g. status data plus the information provided by entity 10 to system 20 about the characteristic, including claim validation data collected by system 20 from authoritative source 40 in process of validating the characteristic), to detailed data (e.g. status data and information validation data plus additional data elements provided by authoritative source 40 about the characteristic and/or entity 10). Data privacy settings may provide entity 10 the ability to protect the exposure of personal data.

In an embodiment, system 20 may allow entity 10 to control what classes or collections of information may be accessible by what privilege grantor 30 thereby assuring that privilege grantors 30 have access to appropriate information in assessing a trust relationship with entity 10 on a need-to-know basis. For example, entity 10 may be an emergency medical technician from Arlington, Va., who wishes to establish a trust relationship with privilege grantor 30, which is the Sheriff's department of New Orleans, to support availability as an emergency responder for crisis events in New Orleans. In this case, entity 10 may define a collection of characteristics (e.g. personae) to system 20 to include only the relevant personal and professional information necessary for evaluation against one or more rule sets defined by privilege grantor 30. Furthermore, entity 10 may also instruct system 20 to only share personal and professional information pertaining to entity 10 with privilege grantor 30 if the rules set by privilege grantor 30 so require and if entity 10 consents to such sharing of information. That is, because entity 10 does not want privilege grantor 30 to have access to other information about entity 10 (e.g., financial background information, medical background information), system 20 may not use such information in forming a trust relationship between entity 10 and privilege grantor 30 and may also not share such information with privilege grantor 30.

As another example, the same entity 10 (i.e., emergency medical technician from Arlington, Va.) may want to form a trust relationship with privilege grantor 30 for a different purpose, in this case to apply for a job with the Sheriff department of New Orleans. In this case, entity 10 may instruct system 20, via the definition of personae, to share financial and medical background information in addition to personal and professional information of entity 10. This may be the case because the rule or rules set by privilege grantor 30 for employment may require the verification of such information as part of selection criteria for the job. Entity 10 may find such a requirement to be reasonable and, therefore, may instruct system 20 to use such information in forming a trust relationship with privilege grantor 30. Thus, entity 10 may provide multiple classes or collections of information to system 20 to respond to multiple trust needs. While an embodiment discussed above features multiple trust needs between entity 10 and the same privilege grantor 30, one skilled in the art will appreciate that entity 10 may have multiple trust needs with multiple privilege grantors 30 that may be accomplished by system 20 without departing from the scope of this disclosure.

Claims, when provided by the entity for which the characteristic itself is representative, are self-vouched, or un-validated. Trust management system 20 may support the ability to interact, in automated and manual methods, with authoritative sources 40 in order to determine whether the information (e.g. claims) is valid and correct. The successful confirmation of a claim, or vouching, by an authoritative source 40 shall validate the claim.

Validation by trust management system 20 to authoritative source 40 by manual means may include the interaction of the system 20 with authorized individuals (representing an authoritative source). Manual validation to authoritative source 40 is known as 'manual, or $3^{rd}$-party-vouching'. Manual validation may include any communication method, including electronic, but must involve the direct and audited interaction of an individual to vouch the entity 10 claim. As an example, entity 10 claims to be a member (e.g. employee) of an organization. The human resources administrator represents the authoritative source (organization) to validate/reject the claim. The administrator is notified via email of the pending claim and interacts with system 20 to validate/reject the claim.

Validation by trust management system 20 to authoritative source 40 by automated means may include the interaction of the system 20 with authorized sources 40 via electronic, data based communication. Automated validation is known as 'data-backed validation'. As an example, entity 10 claims to be a member (e.g. employee) of an organization. System 20 establishes an electronic, data-backed trusted connection with the organization's data system, which includes data about employees. System 20 interacts with organization data system to validate/reject the entity 10 claim.

Claim validation for system 20 by authoritative source 40 provides data privacy and protection to authoritative source 40 (and to entity 10) via a request/validate interrogation structure. Characteristic data provided by entity 10 must include sufficient unique information in order to support validation by authoritative source 40. System 20 provides authoritative source 40 with the request for validation of the claim and provides only those elements of the information necessary for authoritative source 40 to verify that the claim is valid. Authoritative source 40 need only to validate the status of the claim and may share none or some data regarding the claim dependent on policies of authoritative source 40 and separate agreements between authoritative source 40 and entity 10. System 20 stores data about the claim validation transaction (date/time, authoritative source, result). Validation of claims may be bi-directional, in that system 20 and authoritative source 40 may both provide data to complete the transaction, but the claim is an independent, atomic element of entity 10 information only. As an example, entity 10 claims to have a valid Virginia Driver's License. Entity 10 provides system 20 with the State of issuance (VA), the Driver's License number, and the Operator class (automobile). System 20 interacts with the Virginia Department of Motor Vehicles (DMV) (authoritative source 40) by providing the information (State, DL Number, Class) with the request to validate/reject the claim. Authoritative source 40 may provide only a valid/rejected response to system 20 thereby exposing no private data held by the DMV or regarding the entity 10 or may, based on independent policies provide additional data to system 20.

Validation of claims by the trust management system 20 to the authoritative sources 40 is temporal in nature and may be for a temporary, fixed, permanent, or time-to-expiration basis, dependent on the definition of the claim.

In an embodiment system 20 may interact with one or more authoritative sources 40, either via manual or data-backed means, to determine whether the information (e.g. claim) provided by entity 10 is valid and correct. System 20 may receive a response accordingly from authoritative source 40 and store a result of the interaction as well none, some, or all of the data underlying the result.

In an embodiment, privilege grantor 30 may provide system 20 with one or more rules, describing required characteristics of an entity, temporal conditions, event-based status, and/or geo-location of the entity, the satisfaction of which by may allow for the establishment of the relationship of trust between entity 10 and privilege grantor 30.

A relationship of trust, or trust relationship, may be established when the characteristics, or claims, of an entity, including the level of validation of the claim by recognized authoritative sources 40 can be successfully evaluated against a set of criteria (e.g. rules). The relationship of trust, or trust relationship, is a binary indication to the privilege grantor of status against the selected rule set.

A trust relationship is established by system 20 through the evaluation of rules defined by privilege grantor 30 and evaluated against information provided by entity 10. The rule set may contain one or multiple individual rules. The elements of a rule set (e.g. the rules) may be binary (e.g. does entity X have a valid driver's license), complex (e.g. does entity X have a valid driver's license AND is a member (employed) by Organization Y), or include complex, nested expressions (e.g. does entity X have a valid driver's license AND IF SO, then is the expiration of that driver's license more than ninety days in the future.)

The collection of individual rules into a set provides for the federation of multiple claims into fused, or single, trust determinations. The process of federation may be algebraic-based, logic-based, comparative-based, in any combination and include weighting based on the claim and associated validation to determine the satisfaction of the rule set.

System 20 may also use the application of rule sets to determine and establish a numeric representation of the level of satisfaction (e.g. trust) of an entity against specific rule sets, across communities (collections of related privilege grantors 30), and across the entire system. The numeric representation, e.g. trustworthiness or trust score, provides for an abstraction of the underlying entity 10 information, its breadth across multiple classes, and the associated level of validation. The calculation of a trust score is enabled through the federation of validation via multiple authoritative sources 40 against entity 10 claims as well as the satisfaction of rules sets by the entity in establishing trust relationships. (E.g. An entity 10 who has provided information about multiple credentials, multiple capabilities, and multiple memberships each validated by independent authoritative sources 40 could establish a high degree of confidence that the entity 10 was valid.)

In an embodiment, the one or more rules set by privilege grantor 30 in system 20 may be sets of criteria that may define the elements required to enable the establishment of a trust relationship between entity 10 and privilege grantor 30. Furthermore, a trust relationship may be established based on the ability of entity 10 to provide and expose sufficient information that enables privilege grantor 30 to grant entity 10 a permission and/or privilege. For example, in an embodiment, based on a trust relationship formed between entity 10 and privilege grantor 30, trust management system 20 may evaluate (i.e. approve (pre-approve or subsequently approve at a later time) entity 10 for the grant of a permission and/or privilege by privilege grantor 30, based on the rule set applied. A privilege may be permission to enter particular premises at a particular time to provide one or more services, access by an application to a specific computing environment, or notification to the privilege grantor of the satisfaction of the rule by an entity.

System 20 may determine whether entity 10 satisfies the one or more rules set by privilege grantor 30 by evaluating the information provided by entity 10 with respect to the rules provided by privilege grantor 30. System 20 may conduct this evaluate continuously by comparing entity characteristics (and validation status) and existing rule sets and then storing the results of these evaluations for subsequent use. System 20 may then provide/notify the stored result for the rule selected by privilege grantor 30 to determine if entity 10 satisfies the rule and whether a trust relationship is valid. System 20 may provide such information to privilege grantor 30 without providing information about entity 10 stored in system 20, without providing information received from authoritative source 40, or the data underlying the comparison to privilege grantor 30.

In an embodiment, entity 10 may be an individual who may want to establish a trust relationship with privilege grantor 30 for the purpose of receiving privilege. Entity 10 and privilege grantor 30 may have no prior knowledge of each other, other than the need for some privilege defined by rules used by the privilege grantor 30, or by a community that privilege grantor 30 may be a member of. Entity 10 may be, for example, an emergency medical provider, an oil industry worker, or any other such individual who may want to establish a trust relationship with privilege grantor 30 for the purpose of enabling some permission or privilege. To this end, entity 10 will provide information to system 20. This information may include personal data (e.g., biographic information (name, date of birth, contact)), credential identification (e.g. drivers license data, employee ID), capability information (e.g., medical licensure, critical infrastructure responder); membership (e.g., organizations/employers, Louisiana State University-Health Sciences Center, Shell Oil company), or any other such information that may aid in establishing a trust relationship between entity 10 and privilege grantor 30.

Rule sets defined by privilege grantor 30 may contain conditions related to characteristics, or claims, provided by entities 10, temporal conditions regarding the availability of the rule for use, event conditions related to the availability of the rule for use, and/or geo-location conditions related to the temporal location of the entity requesting the privilege or permission. The evaluation of one element of a rule set is independent of another element of the rule set. (E.g. a physical manufacturing plant may specify a set of rules to authorize entry into the premises that includes credential information, capability information, and membership information about an entity 10. The rule set may also include time-based conditions defining the availability of the rule only during business hours. The entity may satisfy the information, or claims-based elements of the rules, thereby providing for the establishment of a trust relationship, but the overall status of the rule will remain invalid unless accessed by privilege grantor 30 during business hours.)

A rule set defined by a privilege grantor 30 may include event-based conditions specifying when the rule is active, or available for use (e.g. a rule set established for the entry of emergency workers post crisis event is only valid when the appropriate condition is defined within the system 20, via an authoritative source 40.)

In addition, or in another embodiment, a rule set defined by a privilege grantor 30 may include geo-location conditions specifying when a trust relationship is active, or available for use by an entity based on the location of that entity as reported to the system 20 by the entity or an authoritative source 40 (e.g. a rule set established for access to a medical facility by an entity 10 is only valid when the location of entity 10 has been established as within a rule-defined distance of the facility.)

A rule set may contain simple, complex, are complex-nested expressions describe the conditions and relationships between conditions related to enabling the trust relationship. Complex nested expressions provide for the capability, within a single rule condition, for the evaluation of related characteristics, sub-characteristics, and data related to characteristics.

The status, or results, of a rule evaluation may be provided to privilege grantor 30 via manual or electronic means (e.g. system 20 may provide entity 10, or privilege grantor 30, with a paper-based representation of the status of the rule set (trust relationship) including the level of detailed information as specified by the rule set and approved by the entity and/or the privilege grantor may access the status of the trust relationship, including the application of any time, event, or geo-location based rules electronically, for action by an individual or application.

The status of rule set evaluations, e.g. trust relationships, may be displayed to privilege grantors 30 in textual, graphical, or augmented reality perspectives, identifying entities 10, the status of the trust relationship, and trust scores. (E.g. a Deputy Sheriff manning a checkpoint to control entry into an area may use paper-based tokens provided by requesting emergency personnel (entities 10), access status information about personnel approved entry (valid trust relationships) by webpage or map overlay via computer (e.g. personal data device, mobile data terminal).

System 20 may establish system-wide rule sets to enable the usage by privilege grantors 30 in un-trusted, semi-trusted, or strongly trusted scenarios (e.g. system 20 may establish a 'public disclosure' rule that allows for entities to publish none, some, or all information about their information for access by privilege grantors.)

In an embodiment, privilege grantor 30 may opt to be grouped into collections, or communities. Communities represent a set of common and potentially related privilege grantors 30 who provide similar or common privileges to entities 10 across the same or different privilege domains or geographies. Communities enable entities 10 to define and select information to enable trust relationships with a group of privilege grantors 30.

System 20, communities (collections of related privilege grantors 30), and/or individual privilege grantors 30 may define and establish rule sets for the establishment of trust relationships with entities 10. Privilege grantors 30 may subscribe, as a shared service, to rule sets defined by the system or an associated community.

In an embodiment, entities 10 define information, claims, regarding their characteristics to system 20. Entity 10 claims may be validated against authoritative sources 40 per defined periodicity. Privilege grantors 30 provide rules to system 20 to define the conditions for the establishment of trust relationships between entity 10 and privilege grantor 30. The establishment of information about entities 10, the subsequent validation of entity 10 claims via authoritative sources, and the evaluation of the information against rules sets are independent actions that occur continuously in the system prior to, during, and after the request by the privilege grantor 30. By this method the system may maintain the status of the trust relationship independent of the transaction itself.

In a manner similar to privilege grantors subscribing to communities to gain access to rule sets, entities may also identify to system 20 those system, community, and specific privilege grantors for which the entity desires to form a trust relationship. Through this identification, the entity can request the system 20 to evaluate the entity information, including validation status, against the defined rule set to determine status and identify, if the evaluation fails, which entity information must be provided and/or validated.

Entity 10 may communicate with system 20 using multiple connection techniques. For example, in an embodiment, entity 10 may communicate with system 20 over a data communication network. The communication network may be a public network such as the Internet. Furthermore, entity 10 may communicate with system 20 over the Internet via a web browser that accesses a web site providing access to system 20 and/or a specific management client that interfaces between entity 10 and system 20. Entity 10, whether communicating with system 20 either directly with a web browser or as part of a management client application, communicates with a secured, authorized connection.

In addition or alternatively, entity 10 may communicate with system 20 via a phone network such as, for example, the public switched telephone network (PSTN) or a cellular network, or any combination thereof. Entity 10 may communicate with system 20 using data access across telephone networks transferring information (send/receive) via SMS/MMS protocols. Entity 10 may also communicate with system 20 via voice access mechanisms enabling entity 10 to provide information (send/receive) with automated voice recognition systems (IVR) as well as human customer support personnel. In particular, entity 10 may provide his information to a representative who then enters the information provided by entity 10 into system 20.

Identity and trust management system 20 may include one or more computing devices configured to provide the features discussed in the present disclosure. The computing devices may include laptops, workstations, servers, handheld computing devices, mobile telephones, and any oilier device capable of performing the features discussed in the present disclosure. Specifically, all the features discussed in the present disclosure may be provided on one computing device or on multiple computing devices that may be interconnected with each other via a Local Area Network (LAN), Wide Area. Network (WAN), and/or Cellular Telephone and Data networks.

In an embodiment, system 20 may include components to receive information from entity 10. As discussed above, this information may be received via a phone network or a data communication network such as, for example, the Internet. To this end, a computing device in system 20 may include a data communication port such as a fiber optic port, coaxial port, cat5 port, or any other such port that may connect the computing device to the data communication network. Entity 10 may also connect to system 20 via Interactive Voice Recognition (IVR) systems that enable entity 10 to provide/receive information within system 20.

System 20 may include database 22, querying engine 24, and comparison engine 26. Generally, information received from entities 10, rules received from privilege grantors 30, and the results obtained from the querying of authoritative sources 40 may be stored in database 22. Querying engine 24 may query authoritative source 40 to determine whether information concerning entity 10 or, if there are multiple entities 10, whether information concerning entities 10 is correct. System 20 may store the results of the querying in database 22 with or without storing any of the data underlying the result of the query. Furthermore, comparison engine 26 may compare the results stored in database 22 with a rule provided by privilege grantor 30 to determine if any entity 10 meets the rule. System 20 may store the results of the evaluation and make this information available to the privilege grantor 30 when requested.

System 20 may then also notify entity 10 as to whether entity 10 has met the rule and if not which information is missing and required. System 20 may do so without providing data stored in database 22 for entity 10 or data underlying the result of the query performed by querying engine 24.

Specifically, system 20 may receive information from entity 10 and store this information in database 22. Database 22 may be any of the commercially available databases that can store member information 10. These may include, for example, Oracle, MySQL, SQLServer, ObjectDB, Mongo DB and/or any series of file-based data storage systems and protocols used to support web-based communications and application interactions, such as XML, XQL, RDF, and SPARQL.

In an embodiment, database 22 may also store rules received from privilege grantor 30. As an example, privilege grantor 30 may be a federal agency, a state agency, a local (county, city, or township) agency, or a any private entity, including an individual or any combination thereof that may have a need to provide restricted access to certain facilities or areas managed by the agency or entity. Examples of federal agencies include the National Transport Safety Board (NTSB), the Federal Emergency Management Agency (FEMA), the Federal Bureau of Investigation (FBI), and other such agencies. Examples of state agencies include state police, state emergency management boards, and other such agencies. Examples of local agencies include county police (sheriff's office), city police, township police, and other such agencies. Examples of private entities may include banks, trading companies, manufacturing plants, consulting firms, law firms, utility companies, oil and natural gas companies, and any other private entity that may want to provide restricted access to its premises.

Privilege grantor 30 may communicate with system 20 using connection techniques similar to those discussed above with respect to communication between entity 10 and system 20 and, therefore, a repetitive discussion is not provided here. As part of this communication, privilege grantor 30 may provide system 20 with one or more rules that need to be met by an entity 10 in order for a trust relationship to be formed between entity 10 and privilege grantor 30. In a sample scenario, privilege grantor 30 may be the Sheriff's department of New Orleans. The sheriff's department may provide a rule that in order for an entity 10 to be able to form a trust relationship with the sheriff's department, entity 10 needs to have a law enforcement background and must be domiciled in the state of Louisiana. If there is more than one rule provided by the same privilege grantor 30, there may be a structure such as, for example, a logical hierarchy, between the plurality of rules provided by the privilege grantor 30. For example, assuming that the rule discussed above is the first rule, the sheriff's department for the city of New Orleans may add a second rule to system 20 which requires that in order to form a trust relationship with it, entity 10 needs to have a law enforcement background but not only be domiciled in the state of Louisiana but must actually reside in the city of New Orleans. A third rule may require entity 10 to not only meet the requirements of the second rule but also that entity 10 should be a certified medical technician ("CMT"). Thus, as discussed above, there is a logical relationship between each of the three rules, wherein, a entity 10 who satisfies the third rule necessarily satisfies the first and second rules but a entity 10 who satisfies the first rule may not satisfy the second and third. One of skill in the art will appreciate that while the disclosure above discusses three rules that share a relationship with each other, privilege grantor 30 may provide any number of rules to system 20, all of which may or may not share a structure with each other thereby providing any level of associated complexity capable of definition within algebraic, logic, and comparative operator means, without departing from the scope of this disclosure.

In addition, or in another embodiment, privilege grantor 30 may set rules that may also have a time/date components. For example, while privilege grantor 30 may have provided the three rules mentioned above to system 20, privilege grantor 30 may activate only the third rule in the immediate aftermath of a disaster so that only law enforcement folks who reside in the New Orleans area and are CMTs may be authorized to gain access to the disaster area. As the need for relief help may increase and the situation turns from a rescue effort to a law and order situation, privilege grantor 30 may activate the first or second rule and deactivate the third rule to allow more law enforcement personnel to be authorized to enter the disaster area. In addition, after the situation may be under control from a law and order perspective, privilege grantor 30 may activate other rules that may authorize more individuals who can help such as, for example, doctors with specialty training, lawyers, insurance agents, etc., to enter the disaster region to help with the situation.

In addition, or in another embodiment, privilege grantor 30 may define conditions between rules than include algebraic, logic, and/or comparison operators to support simple, complex, or complex nested expressions evaluation criteria. For example, while privilege grantor 30 has defined rules associated with enabling entity 10 entry to the Sheriff's department, privilege grantor 30 may define conditions within and across rules to define information and criteria necessary for successful evaluation.

In an embodiment, privilege grantor 30 may activate (or deactivate) rules over a communication interface such as, for example, a web browser or a client management interface if the communication between privilege grantor 30 and system 20 is over a data communication network such as the Internet. Alternatively, the activation/deactivation of a rule may occur over a phone network as discussed above. One of skill in the art will appreciate that the scenarios discussed above are for example purposes only and that any number and types of rules may be provided and activated at different times depending on the need of privilege grantor 30, without departing from the scope of this disclosure.

Upon receipt of information from entity 10, querying engine 24 in system 20 may query authoritative sources 40 to validate the information provided by entity 10. System 20 may be in communication with multiple authoritative sources 40. The type of authoritative source 40 queried by querying engine 24 may depend on the type of information of entity 10 that needs to be validated. In an embodiment, if credential identification information of entity 10 needs to be validated, then querying engine 24 may query a Department of Motor Vehicles ("DMV") database relevant to entity 10, which is an authoritative source 40 for personal credential information issued by a state for drivers. For example, if entity 10 is a resident of New Orleans and supplies personal information pertaining to him (e.g., name, address, height, etc.), then querying engine 24 may query a database of the DMV of Louisiana. Alternatively, if entity 10 asserts that he is a medical doctor with a specialization in radiology, then querying engine 24 may query a database maintained by the American Board of Radiology to determine if entity 10 is certified by the organization. In this case, the database maintained by the American Board of Radiology is an authoritative source 40 for this kind of medical specialization information.

In another example, if entity 10 asserts that he banks with Wachovia Bank N.A., then querying engine 24 may query a database maintained by Wachovia Bank to determine if entity 10 indeed has accounts with Wachovia Bank. In addition, querying engine 24 may also query databases maintained by credit reporting agencies such as, for example, Transunion, Experian, or Equifax. In yet another example, if entity 10 asserts that a particular hospital holds his medical information, then querying engine 24 may query a database maintained by that particular hospital to determine if it indeed holds medical information pertaining to entity 10. In another example, if entity 10 asserts that he is a police officer in Arlington County, Virginia, then querying engine 24 may query a database maintained by the Arlington County police department in Virginia to determine if entity 10 is indeed a police officer with Arlington County, Virginia. In all these examples, each database constitutes an authoritative source 40. One of skill in the art will appreciate that the databases discussed above as authoritative sources 40 are for example purposes only. Other sources of information may also be queried in order to validate information provided by entity 10 and to determine whether, based on the validated information, entity 10 satisfies the rule set by privilege grantor 30.

The querying between querying engine 24 of system 30 and authoritative source 40 may occur over a communication link between system 30 and authoritative source 40. In an embodiment, system 30 may communicate with authoritative source 40 over a data communication network such as, for example, the Internet. Furthermore, the communication between system 30 and authoritative source 40 may be secure and confidential. To this end, system 30 and authoritative source 40 may communicate over a Virtual Private Network (VPN), or may use both asymmetric and symmetric encryption technologies such as, for example, RSA, AES-256, 3DES.

In an embodiment, querying engine 24 may query authoritative source 40 using a querying structure such as, for example, structured query language (SQL) and/or Web Service Definition Language. The querying engine 24 role is to validate the information provided by entity 10 via identified authorized sources. 40. System 20 defines the information to be collected by entity 10 in terms of data structures the enable querying engine 26 to interact with authoritative source 40 and verify the provided information.

The querying engine 24 provides to authoritative source required data, provided by entity 10, to enable authoritative source 40 to verify the data without exposing any addition data to the system thereby enabling authoritative source 40 to retain privacy protection of entity 10 information.

In an embodiment, system 20 may receive a result of a query initiated by querying engine 24 in the form of a response from authoritative source 40. The response received may validate or invalidate an assertion made by entity 10. As described previously, the status and any additional information provided by the authoritative source 40 may be via manual (human) or automated interaction. For example, if entity 10 provides information asserting that he possesses a driver's license from the DMV of Louisiana and is a resident of New Orleans, then querying engine 24 may initiate a query to the relevant DMV database, which constitutes an authoritative source, to validate this assertion. In response, the DMV database may provide different levels of information that may validate the assertion made by entity 10. The classes of information provided by the authoritative source 40 may include status only (valid/invalid), validation data, or detailed additional data. In its most basic form, the authoritative source will either confirm (valid) or reject (invalid) the query by system 20 regarding the entity 10 claim. Additionally one class of information provided by the DMV may be status of the claim plus the street address information as held by the DMV to enable confirmation that entity 10 is a resident of New Orleans. Furthermore, the DMV may also provide information informing system 20 whether the license of entity 10 indicates some special capability of entity 10 such as, for example, hazmat training, or medical technician training. Additional classes of information may include, for example, the expiration date of the license. The DMV may provide yet another class of information that includes more detailed data on entity 10 that is also part of the license information of entity 10. This class of information may include, for example, information as to whether entity 10 is an organ donor. The exposure of this information to system 20 is based on the privacy requirements of the authoritative source and approvals between the authoritative source and the entity independent of the system 20.

In an embodiment, system 20 may store the results of the query initiated by querying engine 24 in database 22. Furthermore, system 20 may store none or some the data underlying the result of the query based on rules established between the system 20 and authoritative source 40 in support of rules defined by privilege grantor 30 and data exposure approved by the entity 10. For example, keeping with the scenario discussed above, system 20 may store the result of the validation of information provided by entity 10, i.e., that entity 10 is a resident of New Orleans, holds a valid drivers license and has hazmat training but may not store the license number, street address information, the expiration date of the license, and the date when entity 10 received hazmat training. Similarly, if querying engine 24 queried a bank database to determine whether entity 10 conducts transactions with that bank, based on information provided by entity 10, system 20 may store the result indicating that entity 10 indeed owns one or more accounts with that bank but may not store actual account information (e.g., account balance, credit lines, etc.) in database 22.

Furthermore, in an embodiment, the information provided by entity 10 may persist in a manner such that querying engine 24 may initiate queries to authoritative source 40 on a periodic basis to ensure that validation results stored in system 20 are current. Thus, for example, system 20 may be configured such that querying engine 24 may query authoritative source 40 at a set time every day, every week or every month, or per a defined elapsed time since the last verification depending on the definition of the claim, authoritative source 40, and/or rule sets. In an embodiment, the frequency of querying, may be set by system 20, privilege grantor 30, or a combination of both components based on the' requirements of the privilege grantor 30 and the change rate of the validating information within the authoritative source 40. Alternatively, querying engine 24 may query an authoritative source 40 just prior to the relevant data being compared to a rule in comparison engine 26. Furthermore, privilege grantor 30 may set different frequencies for querying based on the type of rule that requires the particular type of querying. For example, one rule set by privilege grantor 30 may require that entity 10 be a police officer from New Orleans with HAZMAT training in order for a trust relationship to be formed between privilege grantor 30 and entity 10. Privilege grantor 30 may specify that the relevant databases, i.e., relevant authoritative sources 40 be queried on a weekly basis to validate such information. On the other hand, another rule provided by privilege grantor 30 concerning medical doctors may not require frequent validation. Therefore, privilege grantor 30 may specify that queries for validating medical information pertaining to this rule be performed on a semi-annual or annual basis only. In an embodiment, the frequency of querying may be specified as part of the rule provided by privilege grantor 30. Alternatively, the frequency of querying may set as part of a separate communication between privilege grantor 30 and system 20.

In an embodiment, system 20 may be configured such that comparison engine 26 may compare query results stored in database 22 pertaining to entity 10 with the one or more rules provided by privilege grantor 30 to determine if entity 10 meets the one or more rules provided by privilege grantor 30. For example, in an embodiment, entity 10 may assert that he is a police officer with the New Orleans police department, possesses a driver's license issued by the state of Louisiana, and is a certified medical technician. As discussed above, querying engine 24 may query the relevant authoritative sources 40 to validate this information. Authoritative sources 40 may include, for example, the police department database for New Orleans and the DMV for state of Louisiana. Based on the response received from authoritative sources 40, system 20 may store a result in database 22 indicating whether information provided by entity 10 is indeed whom he asserts. Furthermore, privilege grantor 30 such as, for example, FEMA, may set a rule in system 20 that in order to develop a trust relationship with FEMA, entity 10 needs to be a police officer from New Orleans, holding a Louisiana driving license and also be a certified medical technician. Comparison engine 26 may compare the validation result for entity 10 stored in database 22 to determine if entity 10 meets this rule to form a trust relationship with privilege grantor 30. If the stored validation result indicates that entity 10 meets all the requirements of the rule set by privilege grantor 30, then a trust relationship may be formed between entity 10 and privilege grantor 30.

After such a comparison is performed, system 20 may notify privilege grantor 30 whether entity 10 meets the requirements set forth in the rule provided by privilege grantor 30. In an embodiment, this notification may be provided over the communication network between system 20 and privilege grantor 30. In particular, the notification may occur in the form of an email, a phone call (manual or automated), an indicator on a client interface or web site, or any combination thereof. In addition, or in an alternative embodiment, system 20 may also notify entity 10 of the approval or denial for its request of a trust relationship with privilege grantor 30.

Furthermore, in an embodiment, while system 20 may notify privilege grantor 30 as to whether entity 10 meets the requirements set forth in a rule provided by privilege grantor 30, system 20 may not share any of the data provided by entity 10 or any of the data underlying its validation with privilege grantor 30. Therefore, data provided by entity 10 as part of his assertion and data obtained from authoritative source 40 may remain confidential.

After the comparison defined above system 20 may also provide the results of the comparison to the entity 10 via the mechanisms described above. In the event the comparison is unsuccessful the system 20 will provide the entity 10 information, related to the failure of the rule evaluation against the entity claims and identify the information necessary to satisfy the comparison.

One of skill in the art will appreciate that while the present disclosure discusses examples of a single entity 10, database 22 may store information about multiple entities 10 and may validate information about multiple entities 10 by querying multiple authoritative sources 40 without departing from the scope of this disclosure. Furthermore, system 20 may be in communication with multiple privilege grantors 30 and receive multiple rules from the various privilege grantors 30 without departing from the scope of this disclosure. In addition, comparison engine 26 may compare results stored in database 22 with multiple rules provided by privilege grantor 30 without departing from the scope of this disclosure.

In an alternative embodiment, database 22 in system 20 may be populated with information provided by multiple entities 10. Furthermore, based on the information provided by entities 10, querying engine 24 may query the relevant authoritative sources 40 to validate assertions made by entities 10. The results may also be stored in database 22. By having this information pre-stored in system 20, system 20 may, upon receipt of a rule from privilege grantor 30, be able to immediately identify which entities 10 may satisfy the rule provided by privilege grantor 30 and, therefore, eligible to form a trust relationship with privilege grantor 30. For example, based on information provided by entities 10 and querying performed based on the information provided, system 20 may have a list of police officers (entities 10 in this case) who are residents of the state of Louisiana and are hazmat certified. If in the event of an emergency in Louisiana, FEMA (privilege grantor 30 in this case) decides to use personnel with the characteristics mentioned above, system 20 may be able to immediately form a trust relationship between such personnel (whose data has been validated by system 20) and FEMA, upon receipt of such a rule from FEMA. Alternatively, FEMA may have such a rule pre-stored in system 20 in dormant status. Upon occurrence of a need, FEMA may activate the rule and immediately obtain a list of entities 10 who meet the criteria specified in the rule.

The functionality of database 22, querying engine 24, and comparison engine 26 may be provided on a single computing device or may be distributed across multiple computing devices supporting single, and or multi-tenancy that may be coupled to each other without departing from the scope of this disclosure. Furthermore, the features discussed above may be implemented as one or more software programs executable on a computer readable medium or as one or more hardware components, or any combination thereof, without departing from the scope of this disclosure.

Furthermore, while the system described above discusses an individual entity 10 providing his information to system 20 in order to form a trust relationship with a privilege grantor 30, one of skill in the art will appreciate that the disclosure is not limited thereto. Rather than a single individual providing his credentials to system 20, an organization may provide information regarding all or a portion of its entities 10 to system 20 in order to create trust relationships with privilege grantors 30. For example, an oil company such as Shell, or ExxonMobil may provide information regarding the credentials and capabilities of some of its geological engineers who specialize in oil spill containment to system 20. This information may be input by the human resources group of the oil company. The motive behind this may be that the oil company may want to have a group of specialists validated and trusted by a privilege grantor 30 such as, for example, the US Coast Guard, ready to serve in the event of an oil spill. Alternatively, the organizations themselves may provide information as entities within the system as well as perform as authoritative sources 40, validating membership (employment of individuals), capabilities (certifications), and/or credentials (organization identification cards).

Figure 2A:
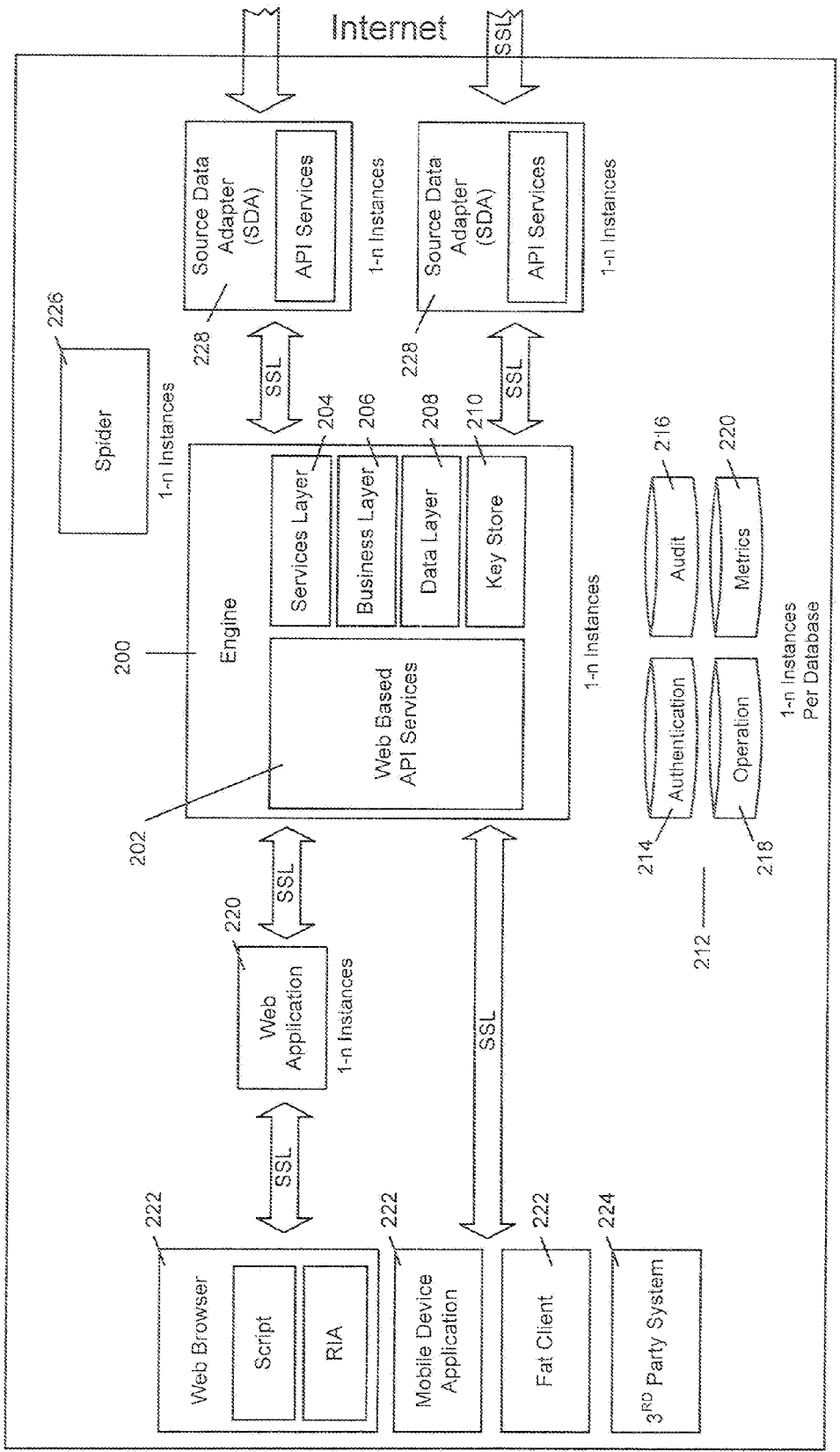

FIG. 2A is a schematic diagram of an embodiment of identity and trust management system 20 and FIG. 2B is a schematic diagram of an embodiment of authoritative sources 40. As described previously system 20 provides for multiple mechanisms for client-based applications to securely interact to provide and manage entity 10 and privilege grantor 30 relationships. Engine 200 of the identity and trust management system 20 may be a server for performing web services 202 (regardless of messaging technology) that provide support for authentication and authorization, profile management, persona management, member data management, trust management and reporting. The web services 202 may be hosted on one or more web servers and may be split into three general layers: services layer 204, business layer 206 and data layer 208. Services layer 204 may provide interfaces to engine 200 for entities 10, privilege grantors 40, administrators, etc. Business layer 206 may process business rules and objects. Data layer 208 may provide data storage and retrieval management. Engine 200 may include support for spraying and load balancing. A single key store 210 may be employed for each instance of the services server. Key store 210 may contain all cryptographic keys for the secure storage of information.

A number of databases 212 may be employed to support engine 200. Databases 212 may be designed to operate on separate server instances from the server or servers of engine 200. Databases 212 may include an authentication database 214, that stores all data relating to authentication and authorization, an audit database 216, that stores audit information for non-repudiation, an operations database 218, which acts as the general operational database for engine 200, and metrics database 220 which provides metrics storage for the operations of engine 200. Databases 212 may be scaled through clustering. Communication between the databases 212 and data layer 208 may be accomplished over secure communication mechanisms.

Access to engine 200 may be provided through web-based APIs as a software-as-a-service. Client applications (which can include web-based applications, thick/fat client applications, mobile applications, or other systems) may interact with the engine 200 using service layer 204. All communications involving service layer 204 may be via secure communication mechanisms. Every communication issued to engine 200 may be individually authenticated, with engine 200 acting as an authoritative authentication service for the client. Authentication may be via standard protocols, such as OAuth, OpenID, etc.

Application 220 may be a web-based application. The application may be hosted on one or more servers and may be used by organizations to perform interactions with engine 200. Support for spraying and load balancing may be included. Application 220 may be implemented as a multi-tenant application to supply different sets of functionality to different communities of the engine 200, with specific interfaces developed for each community. Each domain specific interface implementation will utilize common behavior methods and models mapped back to the standard set of services provided within operation for engine 200. The application 220 provides enables role-based functionality based on the user accessing the system, with that functionality and permissions determined by the individual, the community, and the role selected (e.g., entity (member) 10, authoritative source 40, or privilege grantor 30). Application 220 may support access through one or more web browsers 222, such as Internet Explorer, Firefox, Safari, Chrome, etc. based on availability of functionality via the technology platform. Application 222 can also be implemented as a mobile device application or a thick client application to access Engine 200 through web based service layer 202 via secure communication mechanisms. Engine 200 may also be accessed by individual clients, which may allow individual entities 10 or privilege grantors 30 to access the engine 200 and manage personal information. A management client may also be provided that enables management of engine 200. The management client may be in the form of a thick client interface. Third party systems 224 may also interact with web based service layer 202 of engine 200 via secure communications mechanisms.

Spiders 226 are independent daemon services or distributed software frameworks that operate on the one or more servers forming engine 200 to "crawl" the entity data and trust data associated with engine 200 to evaluate the state of the data (e.g. the comparison). Communication with data layer 208 is accomplished using the same data layer that is used by Web based API services 202 (different instance, same code base). Communications with databases 212 is accomplished through secure communications mechanisms. Spiders 226 may run on a timed basis to look at each set of entities data in the system and determine if it is invalid or valid. This determination can validate or invalidate trust relationships. Optionally, spiders 226 may also proactively create relationships between entities 10 and rules from privilege grantors 30 when all of the requirements of the rules have been met. Because each entity data set that spider 226 encounters could be contacting an external data source for validation, a combination of parameters between spider 226 and the data set can be configured to control how often the data set is checked. This may be useful if a entity data set is tied to an external service that charges for each supported data call.

In support of manual, or 3rd party vouching, engine 200 provides interaction via a client-based application communicating via a secure communication channel to allow entity 10's claims to be validated along with the possible addition of required supporting validation data by a designated validation authority (who may or may not be a participating entity 10 in trust system 20). Once a claim has been either invalidated or validated by the validation authority, all required supporting data for the claim will be stored in database 212 and processed by spider 226 for use by of trust management system 20.

Engine 200 seeks out and obtains information about entities 10 from authoritative sources 40 through source data adapters 228. As noted above, information concerning entities 10 may be based on data that is stored at third party sites. This data can be retrieved from multiple data sources represented by two types, or classes, of locations, third party web services 230 or data centers 232 (see FIG. 2B). Each item of information concerning an entity 10 stored in engine 200 and associated databases 212 may include metadata concerning where to validate the data. When a spider 226 receives this data, it is redirected to contact the appropriate source data adapter 228 which, in turn, may pass the request to authoritative source 40 to validate the data.

Data source adapters 228 may be web services that are based on one or more web servers that support secure communications mechanisms to and from engine 220 and spiders 226. Source data adapters 228 may present a unified interface to both spider services 226 and engine 220, so that source data adapters 228 translate data from authoritative sources 40 to the unified interface. Thus, each source data adapter 228 is customized for the particular authoritative source 40. For example, the same source data adapter 228 may be employed to access DMV data for multiple drivers.

As noted above, engine 200 can obtain data concerning entities from public facing web services 230 or data centers 232 (see FIG. 2B). To interface with public web services 230, source data adapters 228 may be written in a customized manner for particular external data sources.

Each data center 232 is a web service engine provided at an authoritative source 40 that includes protocols necessary to communicate with engine 200. Each data center 232 is a virtual appliance that performs the function of selectively synchronizing data and providing for its retrieval through web services by source data adapters 228. Data centers 232 can obtain data from a number of sources including, but not limited to, almost all commercial databases, LDAP, and intranet data file systems (exchange, sharepoint). Each data center 232 is located within an, organization's IT infrastructure. A transformation engine 234 routinely copies and encrypts needed data to support data associated with entities 10 to an internal database 236. Encryption is provided for all data exchanges in addition each data record may be uniquely identified by a hashed value that only engine 200 can verify.

Communication between source data adapters 228 and data center 232 may be through a commercial moderated VPN. Traffic may be based upon UDP, giving data center 232 the ability of being placed behind almost all corporate firewalls with no configuration changes needed to the corporate IT infrastructure. The VPN channel may be encrypted by the commercial provider, and the communication channel to the source data adapter 228 may be secured by secure communication mechanism. All data being sent may also be encrypted independent of the communication method (e.g. separate message/payload encryption as opposed to transport encryption.)

Figure 3:
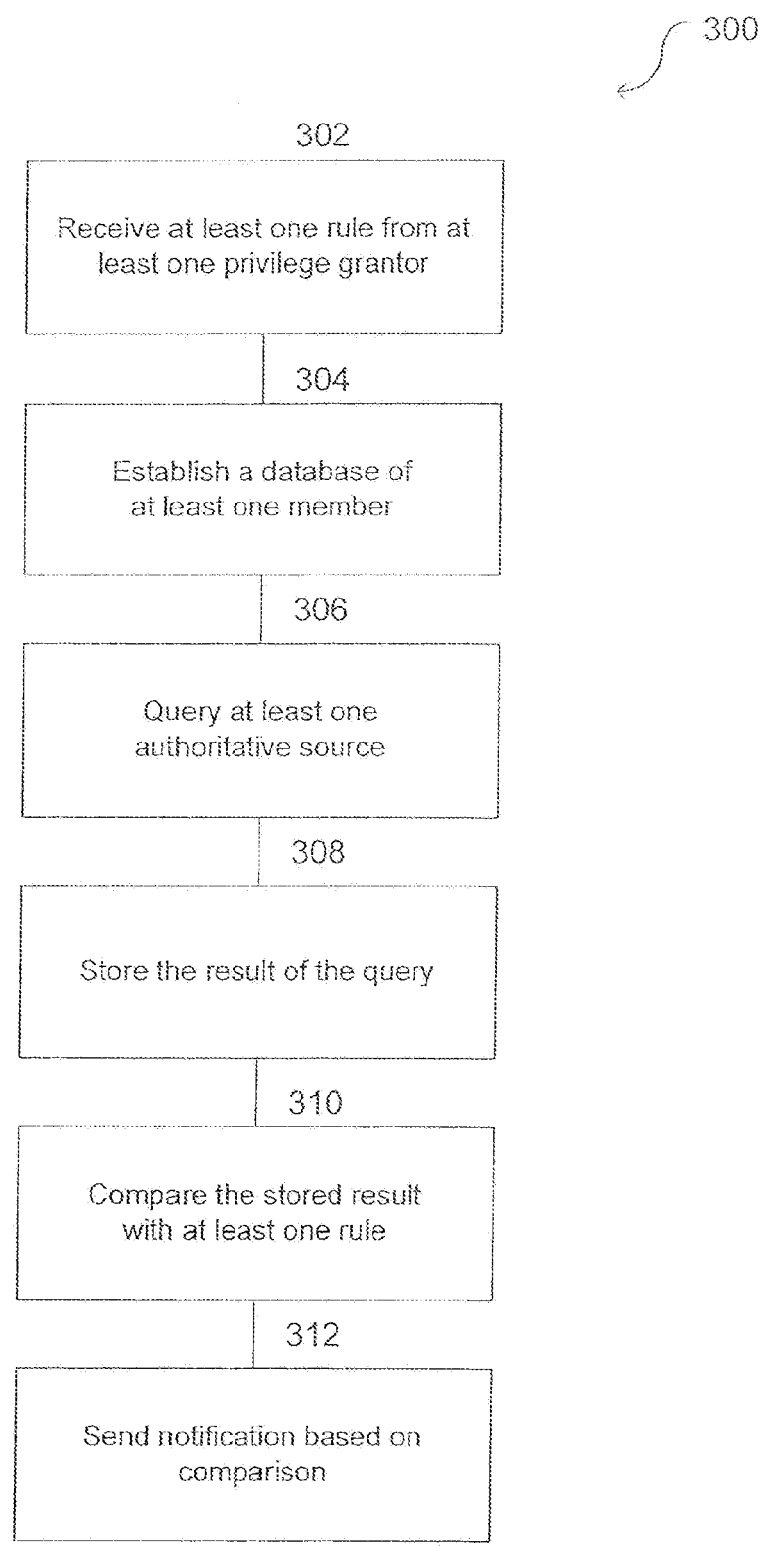
FIG. 3 is a flow chart representation of an identity and trust management method according to a disclosed embodiment.

FIG. 3 is a flow chart representation of an identity and trust management method 300 according to a disclosed embodiment. At step 302, a system such as, for example, system 20 depicted in FIG. 1, may receive over a communication network at least one rule from at least one privilege grantor such as, for example privilege grantor 30 also depicted in FIG. 1, that must be satisfied for the at least one privilege grantor to trust an entity. At step 304, the system may establish a database such as, for example, database 22 depicted in FIG. 1, of at least one entity such as, for example entity 10 depicted in FIG. 1. At step 306, the system may query, using a querying engine such as, for example, querying engine 24 depicted in FIG. 1, at least one authoritative source such as, for example, authoritative source 40 depicted in FIG. 1, to determine whether information about the at least one entity is correct. At step 308, the system may also store in the database a result of the query with or without storing data underlying the result. At step 310, the system may compare the result stored in the database with the at least one rule to determine if the at least one entity meets the at least one rule. At step 312, the system may notify the at least one privilege grantor whether the at least one entity meets the at least one rule based on the comparison, without providing the at least one privilege grantor with either data stored in the database for the at least one entity or the data underlying the result.

While various embodiments of the present disclosure have been described above, it should be understood that they have been presented by way of example only, and not limitation. It will be understood by those skilled in the art that various changes in form and details may be made therein without departing from the spirit and scope of the disclosure. Thus, the breadth and scope of the disclosure should not be limited by any of the above-described exemplary embodiments.

The invention claimed is:

1. A system for determining the identity of an entity who meets trust requirements of a privilege grantor including:
    an identity and trust management system including at least one computing device in communication with at least one entity, at least one privilege grantor, and at least one authoritative source, and at least one computing device being configured to:
    receive, store, and maintain at least one rule from the at least one privilege grantor that must be satisfied for the at least one privilege grantor to establish trust with an entity;
    establish a database of at least one entity with information claims about the at least one entity;
    query the at least one authoritative source to determine whether at least a portion of the information claims about the at least one entity are correct and/or valid;
    receive a response from the at least one authoritative source as to whether or not the portion of information claims is correct and/or valid;
    store in the database a result of the query to the at least one authoritative source with or without storing data underlying the result;
    compare, based at least in part on the response from the at least one authoritative source, the information claims stored in the database with the at least one rule to determine if the at least one entity meets the at least one rule; and
    notify the at least one privilege grantor whether the at least one entity meets the at least one rule based on the comparison of the information claims stored in the database with the at least one rule, by providing the at least one privilege grantor only the results of the comparison stored in the database for the at least one entity to indicate whether the trust requirements are met for the entity without providing the data underlying the result.

2. The system of claim 1, wherein there exists a structure between a plurality of rules provided by the at least one privilege grantor.

3. The system of claim 1, wherein the at least one computing device is configured to query the at least one authoritative source concerning the portion of information claims on a periodic, basis.

4. The system of claim 1, wherein the at least one rule may be based on an information claim, an event, a time/date, a geographic location, or any combination thereof.

5. The system of claim 1, wherein the at least one computing device is configured to receive from the at least one entity information against which the at least one entity permits the system to query the at least one authoritative source.

6. The system of claim 5, wherein the information provided by the at least one entity represents different classes of information.

7. The system of claim 5, wherein the database is configured to store multiple personae for the at least one entity wherein each personae represents a different collection of information about the at least one entity, and the computing device is further configured to receive information from the at least one entity as to which personae the at least one entity permits to be compared to the at least one rule for a particular at least one privilege grantor.

8. The system of claim 1, wherein the at least one entity includes a computer application.

9. A method of determining the identity of an entity who meets the trust requirements of a privilege grantor comprising:
    receiving, over a communication network, at least one rule from at least one privilege grantor that must be satisfied for the at least one privilege grantor to trust an entity;
    establishing a database of at least one entity with information claims about at least one entity;
    querying, using a querying engine at least one authoritative source to determine whether at least a portion of the information claims about the at least one entity is correct;

receiving, over a communication network, a response from the at least one authoritative source as to whether or not the portion of information claims is correct and/or valid;

storing in the database a result of the query with or without storing data underlying the result;

comparing, using a comparison engine, based at least in part on the response from the at least one authoritative source, the information claims stored in the database with the at least one rule to determine if the at least one entity meets the at least one rule; and notifying the at least one privilege grantor whether the at least one entity meets the at least one rule based on the comparison of the information claims stored in the database with the at least one rule, by providing the at least one privilege grantor only the results of the comparison stored in the database for the at least one entity to indicate whether the trust requirements are met for the entity, without the data underlying the result.

10. The method of claim 9, wherein there exists a structure between a plurality of rules provided by the at least one privilege grantor.

11. The method of claim 9, wherein the querying and the comparing occur on a periodic basis.

12. The method of claim 9, wherein the at least one rule may be based on an information claim about the entity, an event, a time/date, a geographic location, or any combination thereof.

13. The method of claim 9, further including receiving from the at least one entity information against which the at least one entity permits the querying of the at least one authoritative source.

14. The method of claim 13, wherein the information represents different classes of information.

15. The method of claim 13, wherein the database stores multiple personae for the at least one entity wherein each personae represents a different collection of information about the at least one entity, and the method further comprises receiving information from the at least one entity as to which personae the at least one entity permits to be compared to the at least one rule for a particular at least one privilege grantor.

16. The method of claim 9, wherein the at least one entity includes a computer application.

* * * * *